United States Patent [19]
Capodieci

[11] Patent Number: 5,591,476
[45] Date of Patent: Jan. 7, 1997

[54] CONCHED CHOCOLATE

[75] Inventor: Roberto A. Capodieci, Glen Ellyn, Ill.

[73] Assignee: Mars, Incorporated, McLean, Va.

[21] Appl. No.: 545,264

[22] Filed: Oct. 18, 1995

Related U.S. Application Data

[63] Continuation of Ser. No. 273,709, Jul. 12, 1994, Pat. No. 5,460,840, which is a continuation of Ser. No. 24,268, Mar. 1, 1993, Pat. No. 5,332,588, which is a continuation of Ser. No. 862,972, Apr. 3, 1992, Pat. No. 5,200,220.

[51] Int. Cl.⁶ .................................................. A23G 1/00
[52] U.S. Cl. ................................ 426/631; 426/660
[58] Field of Search .................................. 426/631, 660, 426/231, 233, 519

[56] References Cited

U.S. PATENT DOCUMENTS

| | | | |
|---|---|---|---|
| 1,591,979 | 7/1926 | Iff | 426/660 |
| 3,506,245 | 4/1970 | Noschinski et al. | 366/172 |
| 3,506,461 | 4/1970 | Noschinski et al. | 99/483 |
| 3,544,328 | 12/1970 | Dunning et al. | 426/660 |
| 3,604,646 | 9/1971 | Keyes, IV et al. | 241/37 |
| 3,654,075 | 4/1972 | Keyes, IV et al. | 162/254 |
| 3,709,442 | 1/1973 | Consoli | 241/65 |
| 3,840,190 | 10/1974 | Consoli | 241/117 |
| 3,861,656 | 1/1975 | Schmitt | 366/348 |
| 3,970,256 | 7/1976 | Ruegger et al. | 241/231 |
| 3,976,806 | 8/1976 | Ziccarelli | 426/613 |
| 3,985,607 | 10/1976 | Schmitt | 159/6.2 |
| 4,017,645 | 4/1977 | Ziccarelli | 426/613 |
| 4,042,721 | 8/1977 | Ziccarelli | 426/613 |
| 4,184,204 | 1/1980 | Flohr | 364/471 |
| 4,460,815 | 7/1984 | Bell, Jr. et al. | 219/69 M |
| 4,538,978 | 9/1985 | Cerboni | 425/206 |
| 4,679,498 | 7/1987 | Chaveron et al. | 99/483 |
| 4,713,256 | 12/1987 | Chaveron et al. | 426/631 |
| 5,156,867 | 10/1992 | Leuthold et al. | 426/231 |
| 5,156,868 | 10/1992 | Muntener et al. | 426/231 |

OTHER PUBLICATIONS

"Enrichment of Chocolate Mass", *Double–Overthrow–Conche DUC 6*, Richard Frisse Maschinenfabrik.
"Conche Brochure", Richard Frisse GmbH.

*Primary Examiner*—George Yeung
*Attorney, Agent, or Firm*—Lockwood, Alex, Fitzgibbon & Cummings

[57] ABSTRACT

A process and a system for combining and physically working chocolate-making ingredients are provided. A variable frequency drive controls the motor of a conching device to increase the efficiency by which energy is imparted to chocolate ingredients during conching. This automatic variable speed approach permits the power to be maintained at a relatively constant and maximum rate, with the speed being determined by the consistency of the ingredients themselves. Feedback associated with the automatic speed variation can be used in order to reduce conching times and vary the quantity of certain ingredients and the timing of and location of their introduction. By the invention, it is possible to standardize the chocolate product during the conching operation and thereby avoid a post-conching standardization procedure with respect to characteristics such as viscosity and fat content.

7 Claims, 6 Drawing Sheets

CONCHED CHOCOLATE

This application is a continuation of application Ser. No. 273,709, filed Jul. 12, 1994, U.S. Pat. No. 5,460,840, which is a continuation of application Ser. No. 024,268, filed Mar. 1, 1993, U.S. Pat. No. 5,332,588, which is a continuation of application Ser. No. 862,972, filed Apr. 3, 1992, U.S. Pat. No. 5,200,220.

BACKGROUND AND DESCRIPTION OF THE INVENTION

The present invention generally relates to the production of chocolate by an improved process and system. More particularly, the invention relates to chocolate production that includes imparting a substantially constant power level to the chocolate refinings being conched. Included is an arrangement for varying the drive speed of the conching equipment in response to the changing consistency of the intermediate chocolate product being conched. The invention enhances chocolate production efficiency by making additional energy available in order to achieve one or more advantages, especially reduction in processing times and optimization of the addition of costly ingredients such as cocoa butter.

Chocolate is a mixture of finely milled solids, chocolate liquor, sugar, milk crumb or powder, all suspended or well dispersed in cocoa butter and/or substitute fat, which at normal processing temperature is the liquid carrying medium. Raw materials such as chocolate liquor, sugar, water and milk are processed into chocolate through a series of processed steps including, for example, crumb making, paste mixing, refining, conching and standardizing. Usually, an emulsifier or an emulsifying system is added during conching.

During conching, chemical and physical processes take place. These include the development of the full desirable chocolate flavor and the conversion of the powdery, crumbly refined product into the chocolate. Conching imparts shearing stresses and kneading action which serve both to liquify the masse and to positively influence and accelerate the flavor development processes. Important physical tasks of conching are to disperse, to dehumidify or remove moisture, to remove unwanted volatile flavors, to break up solid particle agglomerates, to round particle edges and to homogenize. Viscosity is lowered, and flowability and texture are improved.

It is generally accepted that longer conching times produce better chocolate. Enough time is needed to develop proper texture, good mechanical properties, good flavor and the like. A good conching procedure carefully works the chocolate refinings in order to remove undesirable volatiles while releasing other flavor notes that contribute to taste and odor qualities desired of the particular chocolate being manufactured. Conching also effects a natural moisture reduction, a typical chocolate product having moisture levels of below one percent by weight. While longer conching times are generally preferred, commercial chocolate-making operations do place a premium on efficiency. Ideally, this efficiency should not be at the expense of desirable chocolate attributes. For example, chocolate attributes are affected by conching power and heat development. While it is generally beneficial to impart adequately high power levels during conching, the power imparted to the materials being conched should be kept congruent with the consistency of the product itself in order to most appropriately achieve the benefits of conching. While a temperature rise can be a characteristic of many conching procedures, uncontrolled heat development caused by conching friction can result in off-flavors.

Conching procedures and equipment have evolved over the years. Early conches were of the longitudinal type having long marble tubs with raised sides forming a shell. In this shell, an undulating granite roller worked and mixed the chocolate for from 24 to 36 hours. Later, classical vertical mixers such as those developed by Petzholdt were able to reduce conching time to between about 5 to 8 hours by using plow and shear blades to tumble dry refinings in the beginning of dry conching and then, when the mass is plasticized, put energy into the material being conched. Another current rotary conch incorporates a horizontal mixer design which has three shafts with kneading and shearing blades attached. The center blade rotates in one direction and the two outboard shafts rotate the opposite direction, which directions are reversed when desired. These types of horizontal rotary conches provide a so-called "double-overthrow" action to thoroughly mix and bring new material into its high shear zones in order to shorten the dry conching cycle time. Conches of this type, which are available from Richard Frisse GmbH keep the scraping surfaces as large as possible to provide good shearing stress. Scrapers and kneader stirrer arms on the horizontal shafts overlap one another, providing powerful shearing in the masse and at the walls.

During the course of the operation of traditional conching devices such as these, the conching agitators rotate at a constant forward speed. During the course of such a traditional operation, the power imparted to the intermediate product being conched will vary over time, particularly as it begins to plasticize or when ingredients are added to the batch which have a primarily liquid consistency. This traditional approach can include two drive motors, one for forward operation at one constant speed (dry conch), and the other for reverse operation at another (usually faster) constant speed (wet conch).

A possible alternative approach to improve conching would incorporate a drive arrangement that includes a primary drive motor and a second drive motor. The primary one would impart a relatively slow speed to the conching members, while the secondary drive motor would impart a faster speed. Through suitable mechanical arrangements, this dual motor approach would attempt to improve conching by having it take place at two different speeds. In essence, by this approach, a higher power input would be imparted to the conching device when deemed appropriate. That is, for any interval of time, the product being conched would offer a total resistance within the full load torque capability of the motor. One consequence would be to have higher input power intermittently "forced" into the product. However, imparting excessive energy too rapidly tends to form "grit" or hard, small particles that will remain within the finished chocolate, such typically being undesirable in most applications.

Another example of the delicacy of the balance which needs to be maintained in order to provide consistent, superior chocolate products on a commercial scale is the difficulty in achieving the proper viscosity of the finished chocolate in a time-efficient manner. Chocolate viscosity must be low enough in order to facilitate subsequent activities such as enrobing or molding. In most applications, viscosity reduction requires the incorporation of an emulsifier such as lecithin. Traditionally the lecithin addition is carried out at the beginning and/or near the end of the conching operation.

In summary, the present invention is a process and apparatus or system for producing chocolate, with conching being a major step in the system. Chocolate refinings are subjected to conching conditions that are substantially determined by the varying consistency of the ingredients themselves while they are being conched. The present invention has recognized advantages will result from a feedback arrangement wherein the consistency of the material being conched is itself "fed back" to control the conching. By the use of a variable drive arrangement, the conching speed is automatically varied, depending largely upon the viscosity of the ingredients being conched, to such an extent that the power imparted to the ingredients is maintained substantially constant virtually throughout the conching procedure. In addition to varying the conching speed in order to maintain the conching power, the feedback provided by the interaction between the ingredients being conched and the conching equipment can also be used to control ingredients, such as addition of fat or emulsifier, and/or processing conditions used in the conching procedure, such as direction of blade rotation.

It is accordingly a general object of the present invention to provide an improved process and apparatus or system for making chocolate.

Another object of the present invention is to provide an improved process and system which accomplishes chocolate-making by utilizing feedback of data from a conching operation in order to control the conching conditions and/or conching ingredients.

Another object of the present invention is to provide an improved process and apparatus wherein conching is carried out in a manner to maintain substantially constant power input to the equipment effecting the conching procedure and to the chocolate refinings being conched.

Another object of this invention is to provide an improved process and apparatus or system to make chocolate while reducing processing times and/or while optimizing the addition of costly ingredients such as cocoa butter.

Another object of the present invention is to provide an improved procedure and system for producing chocolate which maximizes the efficiency with which conching equipment is used while maintaining the proper consistency of the final chocolate product.

Another object of this invention to provide an improved process and apparatus which protects and respects the delicate, natural system of chocolate.

Another object of the present invention is to provide an improved chocolate-making process and system which substantially avoids grit formation while optimizing processing times.

Another object of the present invention is to provide an improved process and system of producing chocolate which makes chocolate that is especially consistent.

Another object of this invention is an improved process which is universal in its application to conching having the characteristic of an intrinsic rapid decline of the power imparted to the chocolate during the conching cycle.

These and other objects, features and advantages of the invention will be clearly understood through a consideration of the following detailed description.

DESCRIPTION OF THE PARTICULAR EMBODIMENTS

Figure 1:
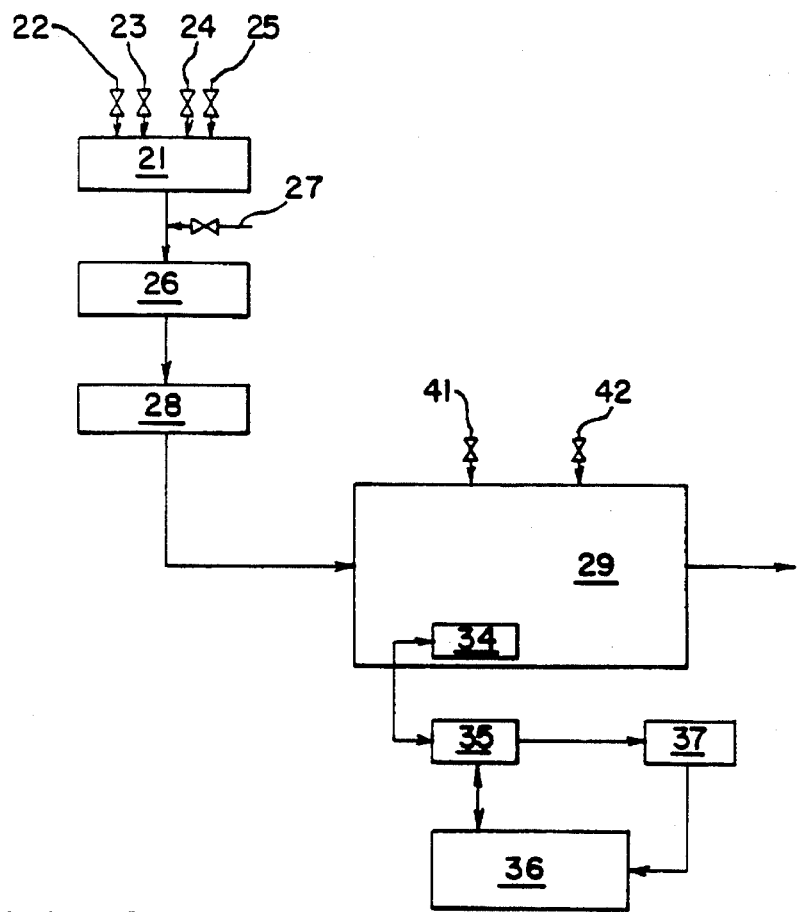
FIG. 1 is a schematic illustration of the process and system according to the invention.

The process and system illustrated in FIG. 1 transforms the raw material for making chocolate into a finished chocolate product. Known raw materials enter a crumb maker 21 which forms a chocolate crumb in a well-known manner. The types of materials thus added would include chocolate liquor, sweetening agents such as sugar, milk components and water, added at 22, 23, 24, 25. These may be incorporated to provide formulations in a manner that is generally well-known. Specific types of components and relative quantities thereof will be appreciated by those skilled in the chocolate making art. The precise quantities desired will be delivered by any suitable mechanism or procedure. Chocolate crumb is transferred to a paste mixer 26 where it is mixed with a fat source, typically cocoa butter, at 27 to form a chocolate paste. The chocolate paste is next refined in accordance with known techniques within a refiner 28. Thereafter, the chocolate refinings are delivered into a conching device 29.

Figure 2:
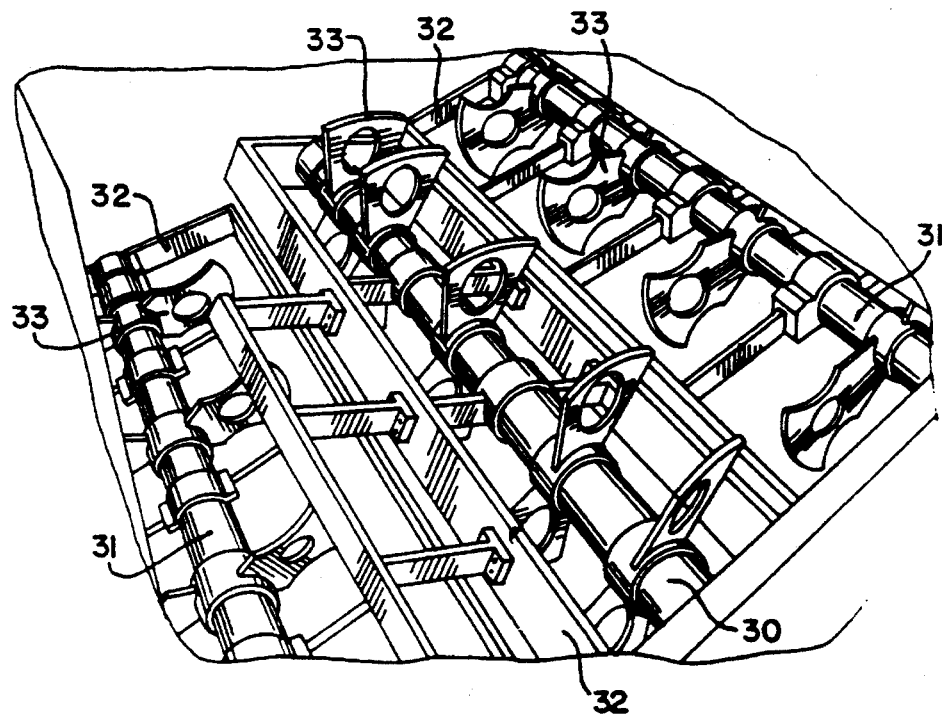
FIG. 2 is a detailed, perspective view of a portion of a typical conching station.

Any number of conching devices are available commercially. Whatever equipment is used, it will include conching agitators to engage and physically manipulate the raw materials being used to make the chocolate. Typical conching agitators are illustrated in FIG. 2. Included are a plurality of rotating shafts 30, 31. Mounted thereto are conching agitators such as the illustrated rotor arms 32 and blades 33. As can be seen in FIG. 2, these rotor arms and blades are oriented to intermesh with each other. In many conching devices, the type of action imparted depends somewhat upon the direction of rotation. Details regarding the operation of these units is known from commercial conching equipment available from various manufacturers.

Conching devices 29 which provide a basic construction that can be beneficially incorporated into the present invention include those of the double overthrow type such as the DUC series manufactured by Richard Frisse GmbH. FIG. 2 is illustrative of this type of conching device 29. Center shaft 30 rotates in a clockwise direction and outer shafts 31 rotate in a counterclockwise direction when the conch operates in its forward mode. These directions are reversed when the conch operates in its reverse mode. The two outer shafts 31 and their associated rotor arms 32 and blades 33 present a smaller working diameter than does the center shaft 30 and its arms 32 and blades 33. They are within a temperature-controlling water-jacketed triple trough assembly. Conventionally, the forward mode is used during filling and during so-called dry conching procedures wherein the chocolate being conched is in a firm, plasticized state. The zones between the central shaft assembly and the counter-current outboard shaft assemblies are areas of intense shear. Upheaval or folding also occurs to more thoroughly mix by exposing more material to conching action.

Usually, the conching procedure includes the incorporation of ingredients in addition to the chocolate refinings. The most common additional ingredients are cocoa butter or other fat or fat substitute sources and emulsifiers such as lecithin or other emulsifier system. FIG. 1 illustrates sources 41, 42 for controlled delivery of these types of additives. Heretofore, it was known to add emulsifier into the conching device 29 and to incorporate cocoa butter into the crumb. After conching was completed in these prior procedures, the chocolate was transferred to a so-called standardizer wherein viscosity and usually other parameters such as particle size, fat content, moisture level and the like are measured and needed adjustments are made. A common adjustment made within a downstream standardizer is the addition of cocoa butter to lower the viscosity of the chocolate. The present invention can eliminate the need for a downstream standardizer inasmuch as the standardizing can take place directly within the conching device by, for example, adjusting conching time and/or adding cocoa butter directly into the conching device and at the precise amount or amounts of cocoa butter or the like needed to effect the standardization. This achieves standardization with respect to function and equipment whereby space, assets and time are conserved.

Conching device 29 includes a motor 34 or other device for imparting rotary motion to the rotating shafts 30, 31. Transmission of the rotary motion from the motor 34 to the rotating shafts 30, 31 is carried out by any suitable means. A suitable motor 34 is a squirrel cage induction motor rated at 110 kilowatts (Kw) and 60 hertz (Hz). In accordance with an important aspect of the present invention, a variable frequency drive is provided to allow the motor 34 to operate at variable speed outputs in order to drive the conching members 32, 33 at continuously varying speeds within a preselected range. A monitoring and controlling function is accomplished. A suitable variable speed drive 35 is an AB1352 Variable Frequency Drive available from Allen-Bradley Company, Inc. It is fully digital, the frequency range of the inverter being from 0 Hz to 200 Hz with a 0.01 Hz resolution. The drive can be programmed to include many process control functions as an integral part of the drive. The drive 35 is rated at 290 kilovoltamperes (Kva).

Figure 3:
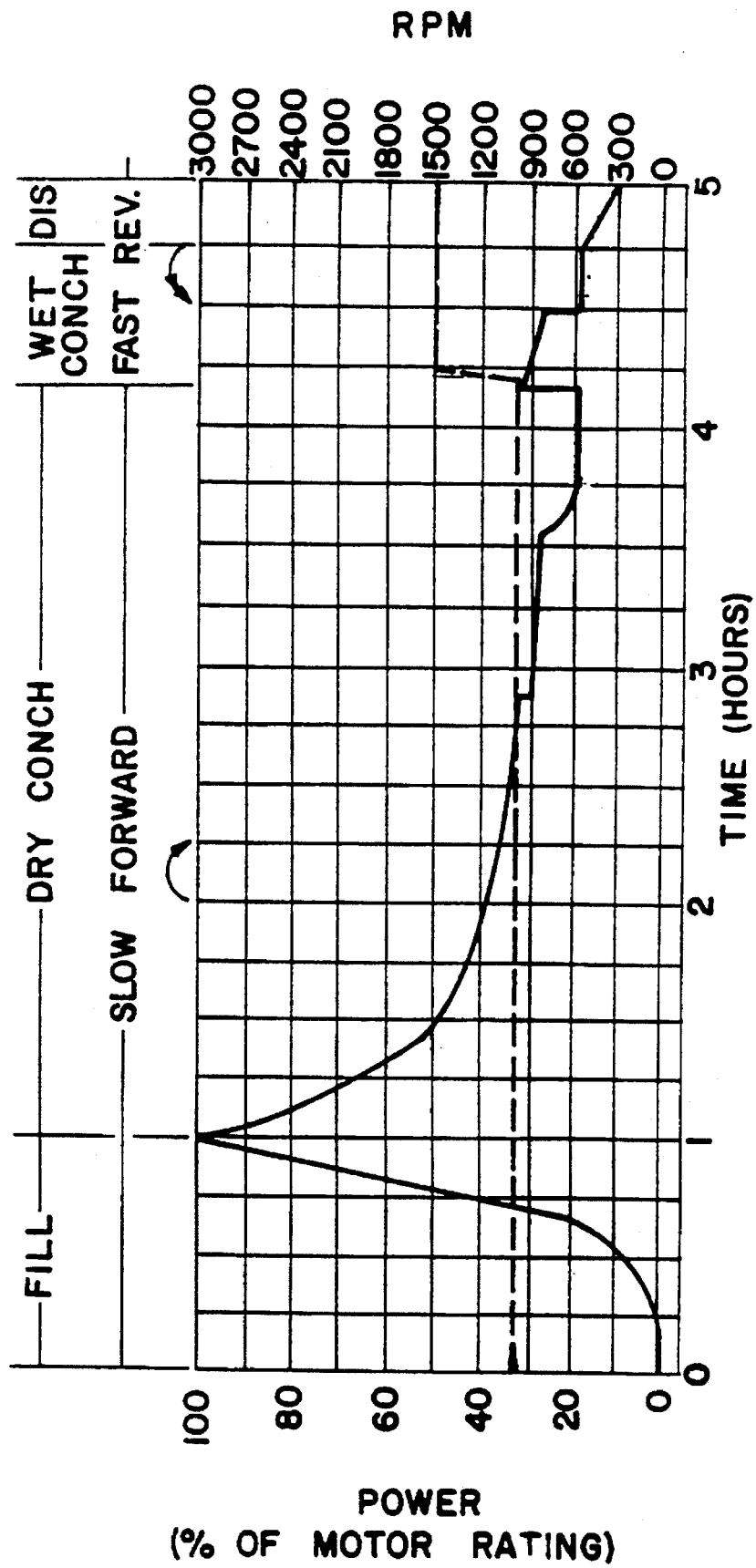
FIG. 3 is a power curve and a speed curve for a typical prior art commercial conching unit.
Figure 4:
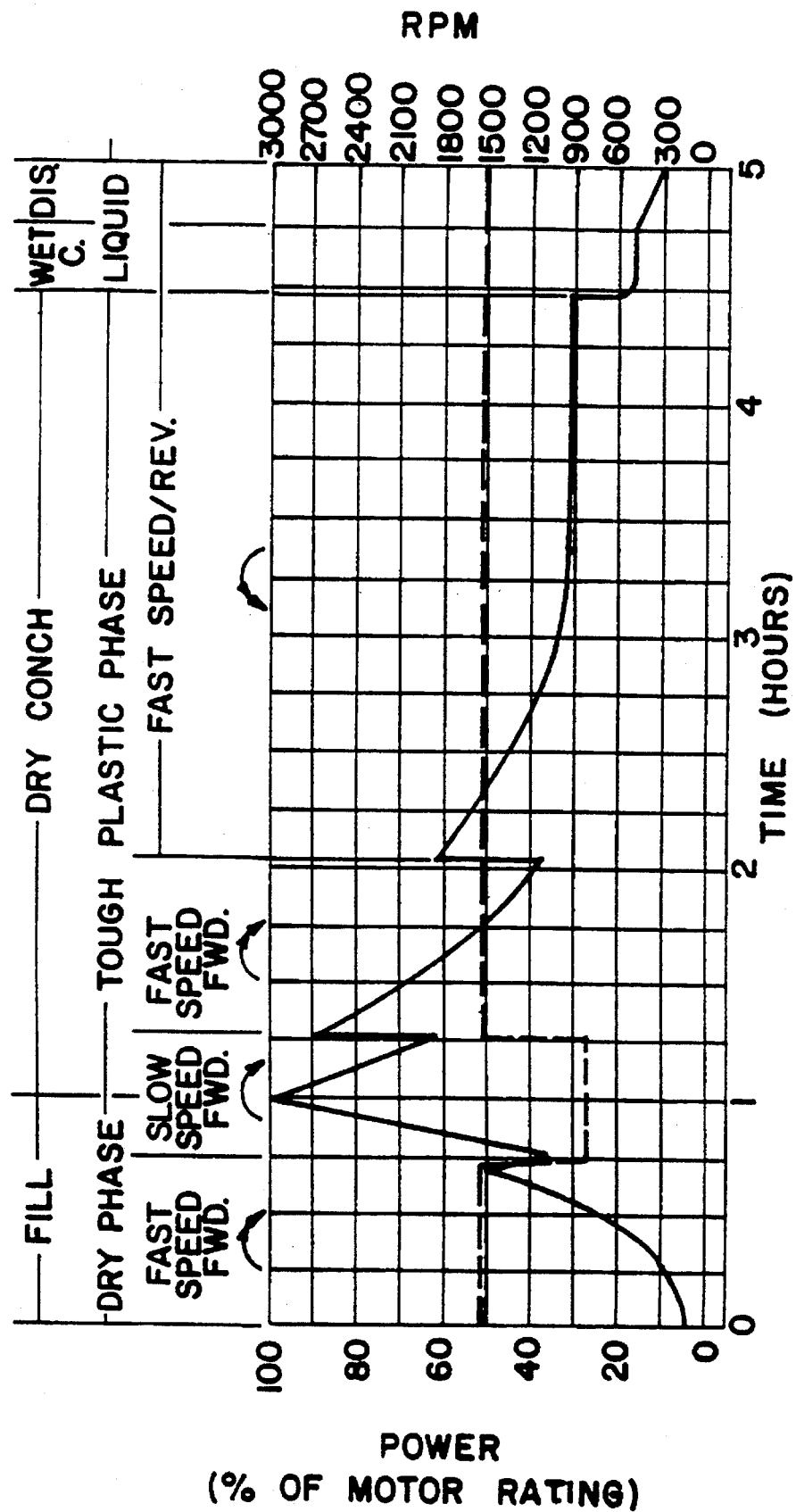
FIG. 4 illustrates a power curve and a speed curve which would result with a possible alternative conching unit which would embody a dual motor approach not including the automatic adjusting and constant power features of the invention.
Figure 5:
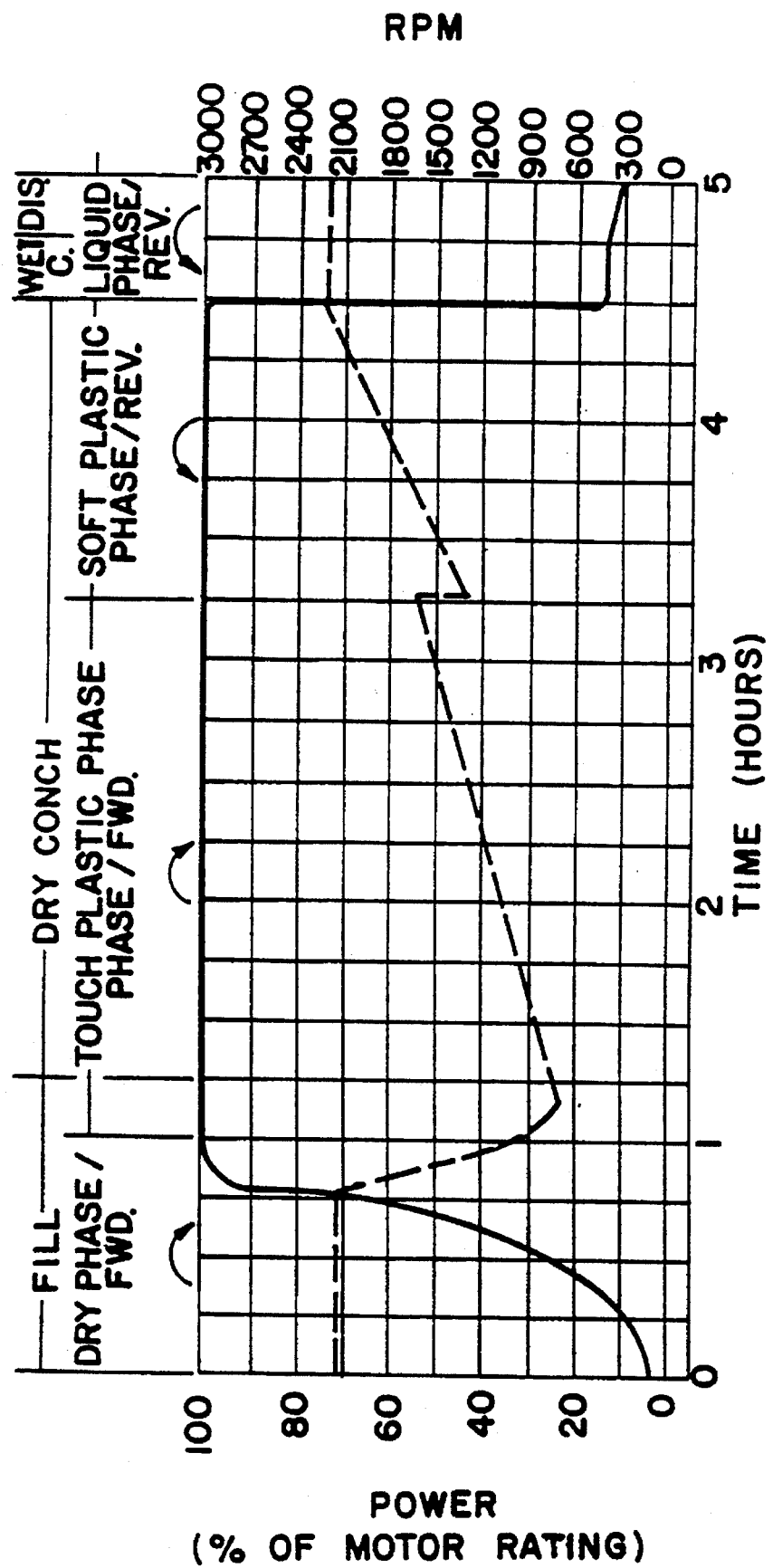
FIG. 5 is a power curve and speed curve for the conching unit of the process and system in accordance with the present invention.

The variable frequency drive 35 varies the speed of the motor 34 depending upon the resistance to rotation of the motor which is encountered during its use. Same includes a known control circuit which varies the speed of rotation depending upon the resistance encountered. The invention does not merely program a fixed motor speed or a fixed sequence of motor speeds wherein the speed of rotation remains at a certain level until a predetermined time period has elapsed or until the rotation direction has changed. Instead, by the present invention, continuous speed variability is imparted in response to the consistency of the materials within the conching device 29, as opposed to any specific timing to modify the speed, if ever, between a selection of speed direction and/or motors running at different, constant speeds. The result of continuously varying motor speed in response to component consistency is a substantially uniform power applied to the materials being conched. Roughly speaking, the power is held constant by increasing the rotational speed of the conching device 29 when less resistance is provided by the materials being conched and by reducing the rotational speed when the resistance provided by the material being conched is increased. FIGS. 3, 4 and 5, discussed herein, generally illustrate these points.

With further reference to FIGS. 3, 4 and 5, these provide a plot of power data and of speed data. FIG. 3 shows these data for a prior art traditional conching unit which operates essentially at a single forward speed and a single reverse speed. FIG. 4 is provided for illustrative, comparative purposes to show the power characteristics if one were to attempt to more efficiently impart power to a conching device by using two substantially constant speed motors wherein the higher speed motor operates in the nature of an overdrive unit in tandem with a larger, slower speed motor. FIG. 5 provides a power curve and a speed curve for a typical embodiment of the present invention.

The prior art power curve of FIG. 3 plots the power, in terms of percentage of the rating of the single speed forward motor and of the single speed reverse motor used, versus the time of operation of the conching device. The forward speed is slower than the reverse speed. During the first four hours of the conching procedure, the motor powers the conching agitators to run in a forward direction at its constant forward speed. The power curve, which is depicted by the solid line, increases steeply during approximately the first hour of use (designated "fill" in FIG. 3) until the maximum power of the motor is reached. At this time, the conching chamber has been filled, and no further dry materials are added. For approximately the next three hours (designated "dry conch"), the dry conching procedure takes place, with the motor operating at the same speed throughout the dry conching period. It will be noted that the power drops precipitously during the first one-half hour or so of dry conching and continues to level off until only about 20% of the motor's power rating is being imparted to the conched materials. At about this time, additional cocoa butter and an emulsifier are added, and the motor is reversed to proceed with the so-called wet conching phase (designated "wet conch"). The increase in motor speed in the reverse direction raises the power applied to the materials being conched to about 30% of the motor rating. The power imparted again drops off, and the chocolate is discharged during the last fifteen minutes or so of the run (designated "dis."). The motor speed curve is illustrated in dotted lines. It will be noted a motor speed of about 800 rpm is the forward speed of the slower and more highly powered motor of this device (designated "slow forward"). The change in motor speed to about 1600 rpm is indicated by the rise in the speed curve when in reverse (designated "fast rev."). The actual energy imparted to the materials being conched is indicated, of course, by the area under the power curve.

The comparative arrangement shown in FIG. 4 illustrates the effects which would be brought about by a dual motor arrangement wherein a faster constant speed motor would be used as an overdrive for a slower constant speed motor. The illustration shows the faster speed motor to impart its same constant speed when reversed. This does not embody the present invention and is presented as a comparative alternative to the prior art arrangement shown in FIG. 3. The filling operation (designated "fill" in FIG. 4) corresponds to a dry phase wherein the chocolate crumb material is added during about the first hour of conch unit operation (designated "dry phase"). As illustrated by the dotted speed curve, in the initial phase, the faster speed motor rotates the agitators forwardly (designated "fast speed fwd."). During this inflow or dry phase operation, the faster speed overdrive ceases, and the slower speed, higher capacity motor provides the driving force (designated "slow speed fwd."). The slower speed motor is illustrated as operating at about 800 rpm, and the faster motor is shown as operating at about 1600 rpm. Both motors can have a rating on the order of about 132 kilowatts. At the time of this switch to the slower speed motor, there would be a precipitous drop in the speed curve, as well as in the power curve. Thereafter, the power curve would rise steeply until the flow of chocolate crumb material into the conching unit ceases. At this point, conching would begin (designated "dry conch" and "tough plastic phase" in FIG. 4). Initially, there would be a sharp drop in the power curve, which drop would continue until the power is "spiked" by again engaging the faster speed motor, after which a relatively steep drop again would occur. Subsequently, the faster speed motor would be reversed in direction (designated "fast speed/rev.") which again would result in a spiking of the power due primarily to a change in the action imparted by the agitators when run in the reverse direction as opposed to the forward direction. Shortly thereafter, the effect of this reversal "spike" would wane. This rotation speed would continue until the tough plastic phase of the dry conching operation develops into a liquid phase (designated "liquid"). At first a wet conching operation, would occur (designated "wet c."), after which the chocolate would be discharged (designated "dis.").

Results achieved in accordance with the present invention are illustrated in FIG. 5. Conching is carried out automatically based upon the consistency of the product being conched. The invention can be characterized by four different phases based upon the consistency of the product: a dry phase, a tough plastic phase, a soft plastic phase, and a liquid phase. Preferably, as illustrated, the chocolate refinings continue to be filled (designated "fill") throughout the initial dry phase (designated "dry phase/fwd." in FIG. 5) and during the beginning stages of the tough plastic phase (designated "tough plastic phase/fwd."). Dry conching (designated "dry conch") continues through to conclusion of the tough plastic phase and during the soft plastic phase (designated "soft plastic phase/rev."). The liquid phase (designated "liquid phase/rev.") begins with an almost instantaneous drop in power when the emulsifier is added, and wet conching proceeds (designated "wet c."). Shortly thereafter, the liquid chocolate is ready for distribution out of the conching unit (designated "dis."). It will be noted that the power is maintained substantially constant throughout the dry conching operation, the power being at the rating of the variable speed drive 35.

An assessment of the dotted-line speed curve indicates how this substantially constant and maximum power output of the motor is able to be maintained. The maximum speed of this motor of about 2100 rpm is initially set in this illustrative example and then drops in response to plasticization. The power imparted to the chocolate refinings continues to increase until the chocolate refinings being filled begin to be plasticized by the relatively fast movement of the agitators. This power increase continues until the desired maximum power is reached, and the tough plastic phase begins. Even during filling, the motor speed drops in response to increased resistance imparted to the conching agitators by the freshly added chocolate refinings, and a plastic condition is evident even during filling. Once conching begins, this resistance begins to subside even further, and the variable speed drive senses this reduction in resistance and automatically increases the motor speed while the motor continues to operate in the forward direction.

When a target viscosity or other suitable parameter is reached, preferably the variable speed motor unit is automatically instructed to reverse its direction. This occurs when the chocolate refinings have been sufficiently plasticized so the soft plastic phase can be initiated. The present invention recognizes that reversing direction relatively early in the dry conching procedure improves conching efficiency. FIG. 5 shows a small initial slow-down in motor speed in order to maintain the constant power rating. More particularly, when the agitators of many commercial conching devices are run forwardly, shearing and kneading occur as the chocolate refinings are moved by and between the agitator paddles. When the agitators are run in reverse, chocolate refinings are forced between back edges of the agitator paddles and the wall of the conching enclosure to generally extrude the product being conched.

The resistance encountered during rotation is translated by known means to the variable speed drive into a frequency signal which corresponds to the viscosity of the chocolate within the conching device 29 during any stage of the operation of the invention. If, at any stage, the viscosity or other parameters such as fat content reach a value at which emulsifier or fat should be added to have the final chocolate exhibit a target parameter, the central processing unit 36 signals the source 41, 42 to deliver the proper amount of additive(s) into the conching unit 29. If the feedback response provided by the chocolate being conched indicates the viscosity and/or other monitored parameters are within the target values for the particular chocolate being prepared, there may be no need to incorporate additional components such as costly cocoa butter and/or there may be no need to continue the conching until the completion of a conventionally designated duration. This feedback procedure, which can be carried out with the aid of a so-called neural network, in effect accomplishes chocolate standardizing directly in the conching unit, thereby eliminating the need for a standardization station downstream of the conching unit.

Figure 6:
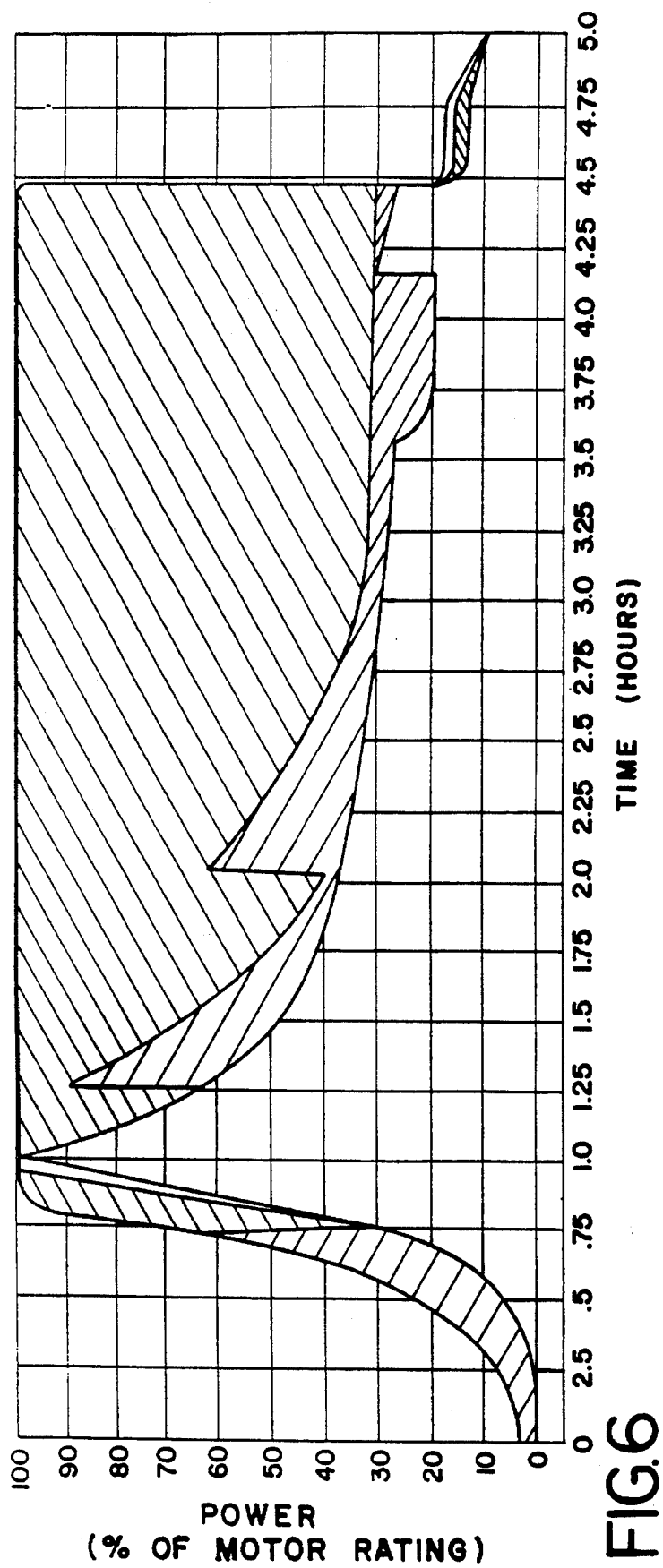
FIG. 6 is a comparative plot of power curves depicted in FIGS. 3, 4 and 5.

FIG. 6 provides an illustration of the advantageous aspect of the present invention wherein substantially increased energy is imparted to the chocolate refinings when compared with other possible approaches. The respective power curves of FIGS. 3, 4 and 5 are superimposed on one another, the respective curves having been time coordinated to permit a generally direct overlay of these power curves. The increase imparted by the FIG. 5 power curve when compared with the prior art FIG. 3 power curve is illustrated by the sum of the cross-hatched area and of the solid area of FIG. 6. The total of this difference approaches 50 kilowatt hours of energy per ton of product. More specifically, the energy imparted is approximately 30 kilowatt hours per ton when processed in accordance with the power curve illustrated in FIG. 3, while the imparted energy is about 80 kilowatt hours per ton of product by the power curve in accordance with the invention which is illustrated in FIG. 5. The cross-hatched area of FIG. 6 generally illustrates the power advantage of the present invention over the comparative illustration of FIG. 4.

The power values and speed values illustrated in FIGS. 3, 4, 5 and 6 are reported in terms of the motor output. It will be appreciated that like values for the conch agitators are lower. The extent that these values are lower is substantially the same for the respective curves so long as the design and size of the conching agitators and vessels associated with the respective motors are substantially the same.

With more particular reference to the motor 34 and the variable speed drive 35, it is important that the variable speed drive have about two or three times the power rating or size of the power rating or size of the motor itself. For example, the motor discussed herein is rated at 110 kilowatts, while the drive has a rating of 290 kilovoltamperes, a factor of about 2.6. This relationship is found to be particularly helpful during the startup phases for a conching unit under full load. A low frequency startup is also desirable. For example, the variable speed unit should permit motor startup at a very low frequency, for example between 1 and 2 hertz in order to avoid the delivery of excess current to the motor during startup and a resultant tripping of the motor's circuit breaker.

As previously stated, a feedback procedure can be incorporated, and it can be facilitated by a neural network 37. A typical network in this regard utilizes a group of processing elements grouped together in layers or slabs. Each layer of processing elements is interconnected with the elements from other layers, the interconnections being called weights. The network is trained as it learns to recognize and adapt to its situation. A properly trained network finds patterns in voluminous data input to it. Suitable software packages useful in connection with this aspect of the invention include Neuralworks Professional II$^+$ available from NeuralWare, with a typical architecture being the Backpropagation network. The input data are collected digitally using an analog-to-digital converter. The inputs include the power supplied to drive the motor and the frequency of the variable speed drive. Outputs include fat content, viscosity and chocolate load or weight.

Figure 7:
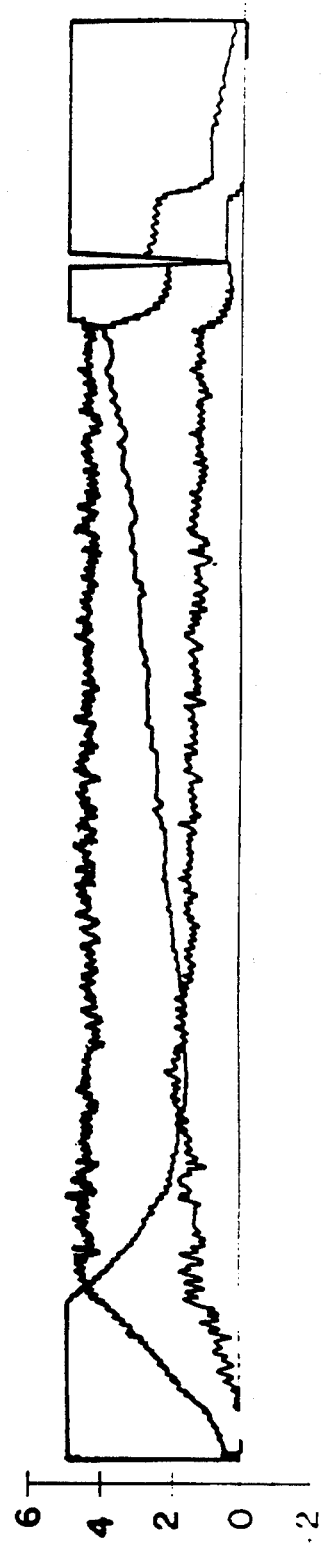
FIG. 7 illustrates patterns of data suitable for training to provide an automatic prediction aspect of the invention.

A training iteration is used in accordance with generally known principles wherein numerous inputs are presented to the network such as those illustrated in FIG. 7. FIG. 7 is the pattern for a particular chocolate batch in a particular conching device. It represents a load of 6620 Kg having a particle size of 19 microns, a water content of 0.93 percent, a fat content of 29.07 percent, and a viscosity of 24,500 centipoises. Inputs such as that shown in FIG. 7 in effect train the network to recognize patterns, often in terms of instantaneous slopes of the data curves. The trained neural network is then available to predict the parameters of each run within the conching device 29. The network predicts results in order to validate or check the load or weight of the chocolate being conched, in order to establish the fat content of the chocolate being conched and in order to predict the final viscosity of the conched chocolate product.

Figures 8, 9:
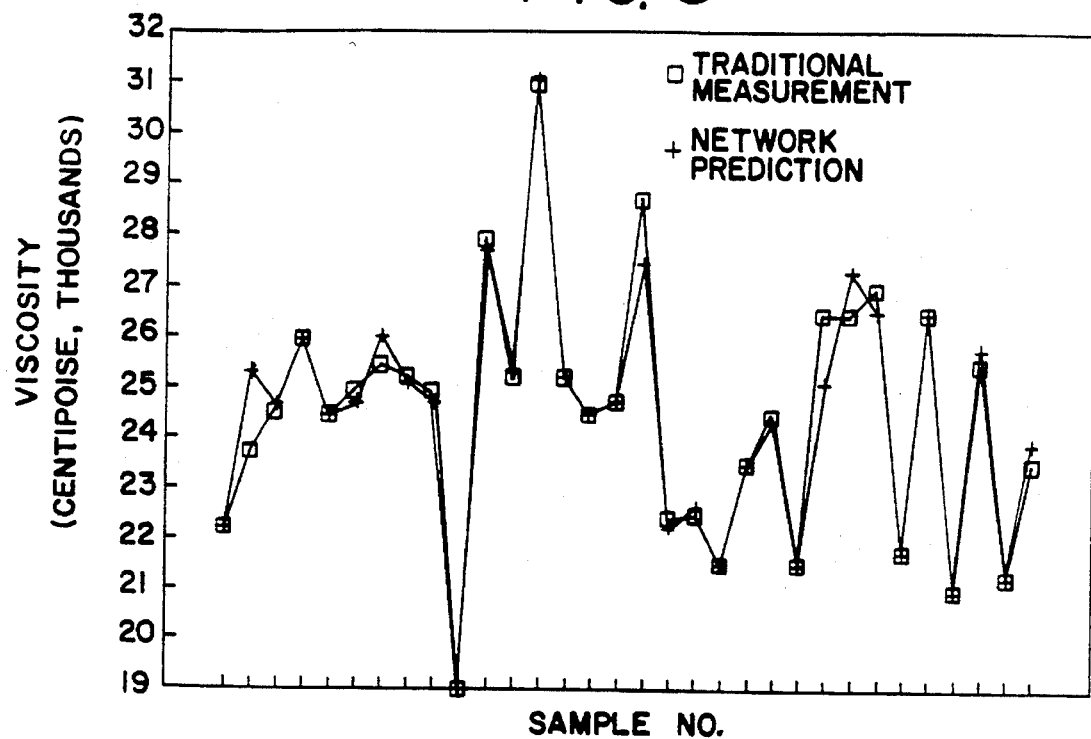
FIG. 8 is a plot of viscosity (in centipoises) for various chocolate samples when measured traditionally and when predicted automatically by an aspect of the invention.
FIG. 9 is a plot of the deviation between the two viscosity values reported in FIG. 7.

Using this arrangement, the viscosity predicted by the neural network for a number of samples was compared with viscosity measurements taken by a traditional quantative measurement procedure for each of the samples, which traditional procedure has a margin of error of about ±6%. FIG. 8 illustrates the good correlation between the measured viscosity and the viscosity predicted by the neural network. FIG. 9 plots of the percentage "error" between the two viscosity values. It will be noted, with one exception, each "error" is less than the margin of error of the traditional viscosity measurement procedure.

Interaction among the motor 34, the variable speed drive 35, the central processing unit 36, the neural network 37 and the additive sources 41, 42 preferably proceeds as follows. By way of a continuous interaction, the variable speed drive inquires of the motor and provides the commands for its operation in terms of frequency. The relationship between the variable speed drive and central processing unit is also two-way wherein the central processing unit inquires of the variable speed drive to obtain frequency data and also provides the commands for modifying its operation such as by dictating when the drive shaft should cease operation of the motor and when the motor operation is to be reversed such as upon reaching a threshold frequency value. The neural network inquires of the variable speed drive for the pattern of data being generated by the chocolate being conched. The neural network then passes information to the central processing unit to present commands to other equipment, particularly the variable speed drive and the additive sources. More specifically, after the neural network carries out its pattern recognition task, it provides input to the central processing unit. Armed with this input, the central processing unit instructs an additive source, for example, when to add emulsifier and/or how much to add, and/or instructs the variable speed drive as to the length of conching time needed for the particular chocolate being conched. The result is an especially efficient conching procedure which conches for only that length of time needed to achieve the target viscosity for that particular chocolate and adds only the amount of fat needed to achieve a target fat percentage.

Consistency is enhanced. The conched chocolate can have a more consistent viscosity from batch to batch, without requiring any post-conching standardization. Conching times in total are reduced because unnecessary conching is eliminated. It is thus possible to conch more product during the same hours of operation of a given conching device. Each conching device is increased in its conching capacity because of the more efficient operation according to the invention. For example, it is possible to effectively conch 7000 Kg of chocolate refinings within a conching device having a capacity of 6000 Kg, which is a capacity increase of about 16 percent.

It will be understood that the embodiments of the present invention which have been described are merely illustrative of an application of the principles of the present invention. Numerous modifications may be made by those skilled in the art without departing from the true spirit and scope of the invention.

I claim:

1. A flowable conched chocolate having an optimized fat content and a preselected maximum viscosity of the conched chocolate which is low enough for enrobing the chocolate, the conched chocolate comprising chocolate refinings and a fat source which had been mixed together and subjected to conching conditions in order to form and to lower the viscosity of a finished flowable conched chocolate, said flowable conched chocolate having no additional fat source in excess of an amount needed to impart said preselected maximum viscosity to said flowable conched chocolate, said amount of the fat source being about 29 weight percent, based on the weight of the conched chocolate.

2. The conched chocolate in accordance with claim 1, wherein said flowable conched chocolate had not been subjected to post-conching standardization and wherein said amount of fat source is lower than otherwise substantially identical flowable conched chocolate which had been subjected to post-conching standardization that includes addition of fat source.

3. The conched chocolate in accordance with claim 1, wherein said flowable conched chocolate has a reduced fat content at said preselected maximum viscosity.

4. The reduced-fat conched chocolate in accordance with claim 1, wherein said fat source is cocoa butter.

5. The reduced-fat conched chocolate in accordance with claim 1, wherein said fat content is from a fat source including cocoa butter.

6. The conched chocolate in accordance with claim 1, wherein said amount of fat source of the flowable conched chocolate is at least one weight percent less than a flowable conched chocolate which required the addition of fat in order to achieve said preselected maximum viscosity.

7. The conched chocolate in accordance with claim 1, wherein said amount of fat source of the flowable conched chocolate product is less than the amount of fat of a flowable conched chocolate which required the addition of fat in order to achieve said preselected maximum viscosity.

* * * * *

UNITED STATES PATENT AND TRADEMARK OFFICE
CERTIFICATE OF CORRECTION

PATENT NO. : 5,591,476
DATED : January 7, 1997
INVENTOR(S) : Roberto A. Capodieci It is certified that error appears in the above-indentified patent and that said Letters Patent is hereby corrected as shown below:

```
Col. 1, line 30, delete "temperature" and insert --temperatures--.
Col. 2, line 18, insert --in-- after "rotate".
Col. 5, line 16, delete "system" and insert --systems--.
Col. 10, line 63, delete "reduced-fat"; line 65, delete
        "reduced-fat".
```

Signed and Sealed this

Fourteenth Day of October, 1997

*Attest:*

*Attesting Officer*

BRUCE LEHMAN

*Commissioner of Patents and Trademarks*